(12) United States Patent
Spani

(10) Patent No.: US 11,383,998 B1
(45) Date of Patent: Jul. 12, 2022

(54) ADVANCED LIQUID TREATMENT AND OXIDATION METHOD AND SYSTEM

(71) Applicant: Wayne W. Spani, Corona, CA (US)

(72) Inventor: Wayne W. Spani, Corona, CA (US)

(*) Notice: Subject to any disclaimer, the term of this patent is extended or adjusted under 35 U.S.C. 154(b) by 0 days.

(21) Appl. No.: 16/873,427

(22) Filed: Apr. 10, 2020

Related U.S. Application Data

(60) Provisional application No. 62/832,239, filed on Apr. 10, 2019.

(51) Int. Cl.
*C02F 9/00* (2006.01)
*C02F 1/66* (2006.01)
(Continued)

(52) U.S. Cl.
CPC .................. *C02F 9/00* (2013.01); *C02F 1/44* (2013.01); *C02F 1/50* (2013.01); *C02F 1/66* (2013.01);
(Continued)

(58) Field of Classification Search
CPC .......... C02F 9/00; C02F 2303/04; C02F 1/50; C02F 1/68; C02F 1/66; C02F 1/44; C02F 2209/06; C02F 2201/002; C02F 2209/001; C02F 1/001; C02F 1/004; C02F 1/444; C02F 1/52; C02F 1/5209; C02F 1/5236; C02F 1/5245; C02F 1/5254; C02F 1/5281; C02F 1/685; C02F 1/686; C02F 1/725; C02F 1/76; C02F 2101/30; C02F 2209/02; C02F 2209/04; C02F 2209/05; B01D 21/0012; B01D 21/01; B01D 21/30; B01D 21/305; B01D 35/027; B01D 36/00; B01D 36/04; B01D 37/00; B01D 37/03; B01D 37/041; B01D 37/048; B01D 61/18; B01D 61/20; B01D 61/22; B01D 2311/03; B01D 2311/10; B01D 2311/12; B01D 2311/26; B01D 2311/263; B01D 2311/2634; B01D 2311/2642; B01D 2311/2646; B01D 2311/2692; B01D 2311/2696
See application file for complete search history.

(56) References Cited

U.S. PATENT DOCUMENTS 2,771,416 A * 11/1956 Ryan ........................ C02F 1/722
 210/205
5,236,595 A * 8/1993 Wang ........................ B01J 39/04
 210/141

(Continued)

*Primary Examiner* — Joseph W Drodge
(74) *Attorney, Agent, or Firm* — John S. Christopher

(57) ABSTRACT

A system for disinfecting aqueous solutions for destroying harmful bacteria, viruses and pathogens in industrial processes including an influent stream containing an invasive species, a pH adjustment stage for maintaining the pH of the influent to within a specific range, a preparation stage for preparing a disinfectant for destroying the invasive species, the disinfectant comprising a quantity of calcium hypochlorite, water, and a catalyst including the metal minerals manganate and manganese oxide, a process mixing stage for receiving and mixing the pH adjusted influent and the disinfectant, a filtration and discharge stage receiving the pH adjusted and disinfected influent for removing foreign matter prior to discharging a filtered disinfected effluent, and a microprocessor control panel for monitoring a plurality of process sensors in each of the stages for controlling the disinfecting of the influent.

4 Claims, 5 Drawing Sheets

(51) Int. Cl.
*C02F 1/68* (2006.01)
*C02F 1/44* (2006.01)
*C02F 1/50* (2006.01)

(52) U.S. Cl.
CPC .......... *C02F 1/68* (2013.01); *C02F 2201/002* (2013.01); *C02F 2209/001* (2013.01); *C02F 2209/06* (2013.01); *C02F 2303/04* (2013.01)

(56) References Cited

U.S. PATENT DOCUMENTS

| | | | | |
|---|---|---|---|---|
| 5,314,629 A | * | 5/1994 | Griese | C02F 9/00 210/202 |
| 5,512,182 A | * | 4/1996 | Sheikh | C02F 1/722 210/668 |
| 9,168,318 B2 | * | 10/2015 | Alimi | A61K 33/20 |
| 2004/0164029 A1 | * | 8/2004 | Souter | C02F 1/76 210/764 |
| 2004/0217326 A1 | * | 11/2004 | Souter | C02F 1/56 252/179 |
| 2005/0005772 A1 | * | 1/2005 | Spani | B01D 45/02 96/200 |
| 2007/0187329 A1 | * | 8/2007 | Moller | C02F 1/5245 210/670 |
| 2010/0163492 A1 | * | 7/2010 | Andrilenas | G06Q 50/06 210/663 |
| 2012/0000859 A1 | * | 1/2012 | Mitzlaff | C02F 1/5209 210/745 |
| 2013/0062288 A1 | * | 3/2013 | Spani | B01D 21/34 210/709 |
| 2013/0105370 A1 | * | 5/2013 | Spani | B01D 37/04 210/85 |
| 2013/0284678 A1 | * | 10/2013 | Daly | C02F 1/008 210/722 |
| 2014/0175015 A1 | * | 6/2014 | Nishimi | B01J 20/18 210/667 |
| 2014/0339159 A1 | * | 11/2014 | Gong | C02F 1/66 210/631 |
| 2017/0066671 A1 | * | 3/2017 | Carnahan | C02F 1/66 |
| 2018/0050938 A1 | * | 2/2018 | Duta | C02F 1/727 |
| 2019/0193422 A1 | * | 6/2019 | Ferrari | B41J 3/4073 |
| 2019/0194046 A1 | * | 6/2019 | Sweeney | C02F 1/72 |
| 2019/0208774 A1 | * | 7/2019 | Lei | A01N 59/00 |
| 2020/0262717 A1 | * | 8/2020 | Sampson | C02F 1/008 |

* cited by examiner

ADVANCED LIQUID TREATMENT AND OXIDATION METHOD AND SYSTEM

This patent application is being filed as a non-provisional patent application under 35 USC Section 111(a). A provisional patent application under 35 USC Section 111(b) for the subject invention was filed on and has a priority date of Apr. 10, 2019.

BACKGROUND OF THE INVENTION

Technical Field

The present invention generally relates to a process for disinfecting aqueous solutions. More specifically, the present invention relates to methods and apparatus for disinfecting aqueous solutions utilizing a metal-oxy chloride process employing a nontoxic, inert and environmentally safe disinfectant to destroy harmful pathogens and invasive species in multiple processes, such as, for example, medical systems, food processing, water purification systems and the like with.

Background Art

Aqueous solutions are defined as pertaining to, similar to, containing, or dissolved in water. Microscopic life forms such as nuisance and harmful bacteria, viruses, pathogens, fungus, molds, algae, microorganisms, and other harmful aquatic life forms, such as mussels and protozoa, and the precipitation of sulfur and other metals often live or exist in these aqueous solutions. These microscopic life forms and invasive species are often found in the waters employed in sterile medical systems, food processing systems, water purification systems, beer manufacturing and the like. Consequently, the existence of these microscopic life forms and invasive species in the water are not consistent with these processing systems and must be destroyed and removed.

The current state of the art in water treatment systems for destroying and removing microscopic life forms and invasive species from aqueous solutions is to utilize high levels of the chemical chlorine, hydrogen peroxide, bleach, high temperature liquids, and steam applications. Of these options, the use of chlorine is the very common. A search of the Internet reveals that there are many water treatment systems available for use in industrial and domestic applications. Further, many of those applications utilize chlorine based chemistry while other applications are designed to remove chlorine from drinking water supplies. Chlorine is widely and successfully used in water treatment applications because it is both very effective at killing bacteria and relatively affordable to use. Chlorine is an inexpensive chemical, and it can be stored and transported relatively easily. However, special precautions need to be observed because of its toxic nature. This chemical works quickly to disinfect water based solutions but because it is a chemical disinfectant, it stays active in the water for some time. Thus, this prevents the water from becoming re-contaminated after it leaves the treatment phase.

In an entry by the American Society of Biochemistry and Molecular Biology, chlorine is described as a non-metallic chemical element having atomic number 17, symbol CL, atomic weight 35.45, melting point −149.8 degrees F. (−101 degrees C.), and boiling point −29.02 degrees F. (−33.9 degrees C.). Chlorine is a highly poisonous, greenish yellow gas which is about two and a half times as dense as air with a strong sharp, chocking order. Chlorine is very toxic and has been used as a weapon in warfare. In spite of its disagreeable nature, many products that are used daily contain chlorine and is one of the top ten chemicals produced and used in the United States.

The common use of chlorine for use as a treatment for eliminating and controlling pathogens, bacteria, viruses and other invasive species including hydrogen peroxide and bleach in aqueous solutions results in a highly toxic solution. Further, the resulting toxic solution is hazardous, corrosive, energy intensive, environmentally damaging, equipment and maintenance intensive, in addition to not being economical and cost effective. Additionally, human contact with this toxic and corrosive solution can be harmful to human health and the environment and thus use of chlorine requires special training. Once chlorine is introduced into the environment, it remains for a protracted time period.

Therefore, there is a need in the art for an advanced liquid treatment and oxidation method and system having: a stage for adjusting to a specific range the pH chemistry of an influent stream containing invasive species, pathogens and metals; a preparation stage for preparing a disinfectant for destroying the invasive species where the disinfectant is comprised of calcium hypochlorite, water and a catalyst; a process mixing stage where the pH adjusted influent and disinfectant are mixed; a filtration and discharge stage where foreign matter is removed from the mixed pH adjusted and disinfected influent prior to discharging a filtered disinfected effluent; and a system microprocessor control panel for controlling the disinfecting of the aqueous solution influent.

DISCLOSURE OF THE INVENTION

Briefly, and in general terms, the present invention provides a new and improved advanced liquid treatment and oxidation method and system for disinfecting aqueous solutions containing harmful bacteria, viruses and pathogens which are typically found in the medical systems, food processing, water purification systems and the like.

The advanced liquid treatment and oxidation method and system is employed to disinfect aqueous solutions by utilizing a metal-oxy chloride process intended to destroy harmful bacteria, viruses and pathogens and other organisms in multiple industrial processes. In general, the method and system of the present invention can be utilized in three separate modes. In a first mode of use, an influent containing harmful bacteria, viruses, pathogens, fungus, molds and other harmful invasive materials is introduced into a first stage of the inventive liquid treatment and oxidation system. In the first (pH adjustment) stage, the content of the influent is exposed to a first bank of sensors that communicate with a system microprocessor control panel that directs the injection and mixing of chemicals into an influent surge/pH adjustment tank to adjust the pH of the influent to a range of (6.5-to-7.2) which has been determined to be suitable for this process.

The pH adjusted influent is then exposed to a second bank of sensors within the first stage which communicates with the microprocessor control panel to determine whether the pH and associated parameters of the influent are suitable for pumping the pH adjusted influent to a second stage. The second stage is a disinfectant mixing and process preparation stage having a mixing and disinfectant tank. The pH adjusted influent is either forwarded to (a) the mixing and disinfectant tank of the second stage or, if not acceptable to the standards enumerated in the microprocessor control panel, (b) returned to the pH adjustment tank of the first stage for additional treatment.

A third stage comprising a preparation and blending section includes both a preparation tank and a holding/storage tank. A chemical catalyst is injected into the preparation tank along with water and a combination of chemicals for providing a disinfectant that is effective in destroying the invasive species including bacteria, viruses, pathogens, and other organic and inorganic pollutants. The disinfectant created in the preparation tank of the third stage is a combination of the chemical catalyst, calcium hypochlorite and water. Further, the catalyst is comprised of a combination of chemicals which facilitates the destruction of the invasive species. This combination of chemicals does not exhibit the corrosive nature of the chlorine preparations used in the past to destroy the invasive species carried within the influent liquids. Moreover, the chemical combination of the disinfectant does not damage the environment.

In particular, the disinfectant is a loosely bound chelation of metal minerals with oxygen in a liquid form. This oxygen molecule was purposely developed to be weakly bound so that when in contact with inorganic matter, organic matter, or microorganisms, it will readily surrender oxygen atoms that will aggressively oxidize all desired contaminants. A unique feature of this reaction is the release of single atoms of oxygen. These oxygen atoms embed into the molecular structure of the organic material and the structure of the pathogens, bacteria, viruses and microorganisms thereby perpetuating the release of highly active atoms of oxygen. The blended disinfectant capitalizes on the properties and principles of the Haber-Weiss reactions. When introduced as a disinfectant, the following sequence occurs to the invasive species: (1) oxidation of scavengers; (2) pre-oxidation/disruption of the membrane layers; (3) oxidation of the Thiol groups; (4) enzyme inhibition; (5) oxidation of nucleotides; (6) impaired energy production; (7) disruption of protein synthesis; and (8) cellular death of the invasive species. The destruction of these invasive species is accomplished by employing "over-oxidation techniques" to disrupt the DNA structure of the invasive cell of the bacteria, virus, pathogen or the like. The liquid disinfectant is then pumped through an arrangement of control valves to either (a) the holding/storage tank of the third stage for later use, or (b) directly to the mixing and disinfecting tank in the second stage.

In a fourth stage of the first mode of use, the pH adjusted and disinfectant treated influent is pumped from the mixing and disinfectant tank of the second stage to a reaction stabilization, settlement, filtration and discharge stage having a plurality of tanks including (a) a settling tank for the settling out of particulate matter; (b) discharging through another bank of sensors that communicate with the microprocessor control panel; leading to {c} a coalescing tank for filtering out heavier particles and oil residue from the influent; and (d) a surge tank for regulating the flow of influent in the advanced liquid treatment and oxidation system. The filtered influent is then exposed to a final bank of sensors for ensuring that the quality of the processed influent meets the requirements set forth by the microprocessor control panel prior to (1) discharge as an effluent discharge, or (2) to re-circulation back to the influent input for further treatment. The effluent discharge can now be utilized as disinfected potable water or discharged to the environment.

In a second mode of use, the advanced liquid treatment and oxidation method and system is used for large fluid applications. For example, the liquid treatment method and system of the present invention is utilized to disinfect large applications, for example, a raw water supply for a food processing application or an industrial process. Under such an application, introducing a raw water supply would require the disinfecting of millions of gallons of water per day to kill invasive species. Such invasive species might include slime, slurries, algae, fresh water mussels, and other invasive species. In the second mode of use, each of the previous steps discussed in the first mode of use of the present invention are practiced including: the influent being subjected to multiple banks of sensors communicating with the microprocessor control panel; pH adjustment; creating a chemical solution comprising water, a chemical catalyst and other components for creating the disinfectant; pumping the disinfectant and the pH adjusted influent into a mixing tank; and pumping large volumes of the treated influent through settling, coalescing and surge tanks for filtering the disinfected influent prior to discharging from the liquid treatment and oxidation method and system. The large volumes of the disinfected effluent is now suitable for use in washing vegetable produce, manufacturing beer or ales, and other applications requiring large volumes of disinfected water.

In a third mode of use, a pre-blended disinfectant solution is introduced into the storage tank (of the third stage) of the advanced liquid treatment and oxidation method and system. That is, the step of creating the chemical disinfectant in the third stage preparation tank is replaced by introducing a pre-blended disinfectant solution into the third stage storage tank from an off-site blender operation. This pre-blended disinfectant is utilized to treat the influent to destroy the invasive species as previously described. All of the steps practiced in the first mode of use are included such as: the influent being subjected to multiple banks of sensors communicating with the microprocessor control panel; pH adjustment; introducing the pre-blended disinfectant into the third stage storage tank; pumping the disinfectant and the pH adjusted influent into a mixing tank; and pumping the treated influent through settling, coalescing and surge tanks for filtering the disinfected influent prior to discharging from the liquid treatment and oxidation method and system. Further, the chemistry of the pre-blended disinfectant can subsequently be adjusted in the liquid treatment and oxidation method and system within the mixing and disinfectant tank (in the second stage) if the off-site pre-blended disinfectant is not within the system specifications.

The present invention is generally directed to an advanced liquid treatment and oxidation method and system for disinfecting aqueous solutions utilizing a metal-oxy chloride process to destroy harmful bacteria, viruses and pathogens in industrial processes such as medical systems, food processing, and water purification systems including an influent stream containing an invasive species, a pH adjustment stage for maintaining the pH of the influent to within a specific range, a preparation stage for preparing a disinfectant for destroying the invasive species, the disinfectant comprising a quantity of calcium hypochlorite, water, and a catalyst including the metal minerals manganate and manganese oxide, a process mixing stage for receiving and mixing the pH adjusted influent and the disinfectant, a filtration and discharge stage receiving the pH adjusted and disinfected influent for removing foreign matter prior to discharging a filtered disinfected effluent, and a system microprocessor control panel for monitoring a plurality of process sensors in each of the stages for controlling the disinfecting of the influent.

These and other objects and advantages of the present invention will become apparent from the following more detailed description, taken in conjunction with the accompanying drawings which illustrate the invention, by way of example.

DETAILED DESCRIPTION OF THE INVENTION

The present invention relates to an Advanced Liquid Treatment and Oxidation Method and System 100 as shown in Applicant's FIGS. 1-5 (hereinafter referred to as the Advanced Liquid Treatment System 100) of the present invention. The Advanced Liquid Treatment System 100 is intended for use in disinfecting aqueous solutions 102 for destroying harmful bacteria, viruses, pathogens, algae, microorganisms, mussels, and other invasive species in multiple industrial processes. Examples of such industrial processes include, but are not limited to, medical systems, food processing, water processing, beverage manufacturing, purification systems, and the like.

In the description set out below, the Advanced Liquid Treatment System 100 is divided into four separate stages including: {a} an Influent pH Adjustment Stage 106 shown in FIG. 2 which receives an influent 108 to be treated; {b} an Influent-Disinfectant Process Mixing Stage 110 shown in FIG. 3; {c} a Disinfectant Preparation Stage 112 shown in FIG. 4; and {d} a Filtration and Discharge Stage 114 shown in FIG. 5. A system microprocessor control panel 116 employed for monitoring the system parameters and controlling the operation of the Advanced Liquid Treatment System 100 is shown on FIG. 3.

Figure 1:
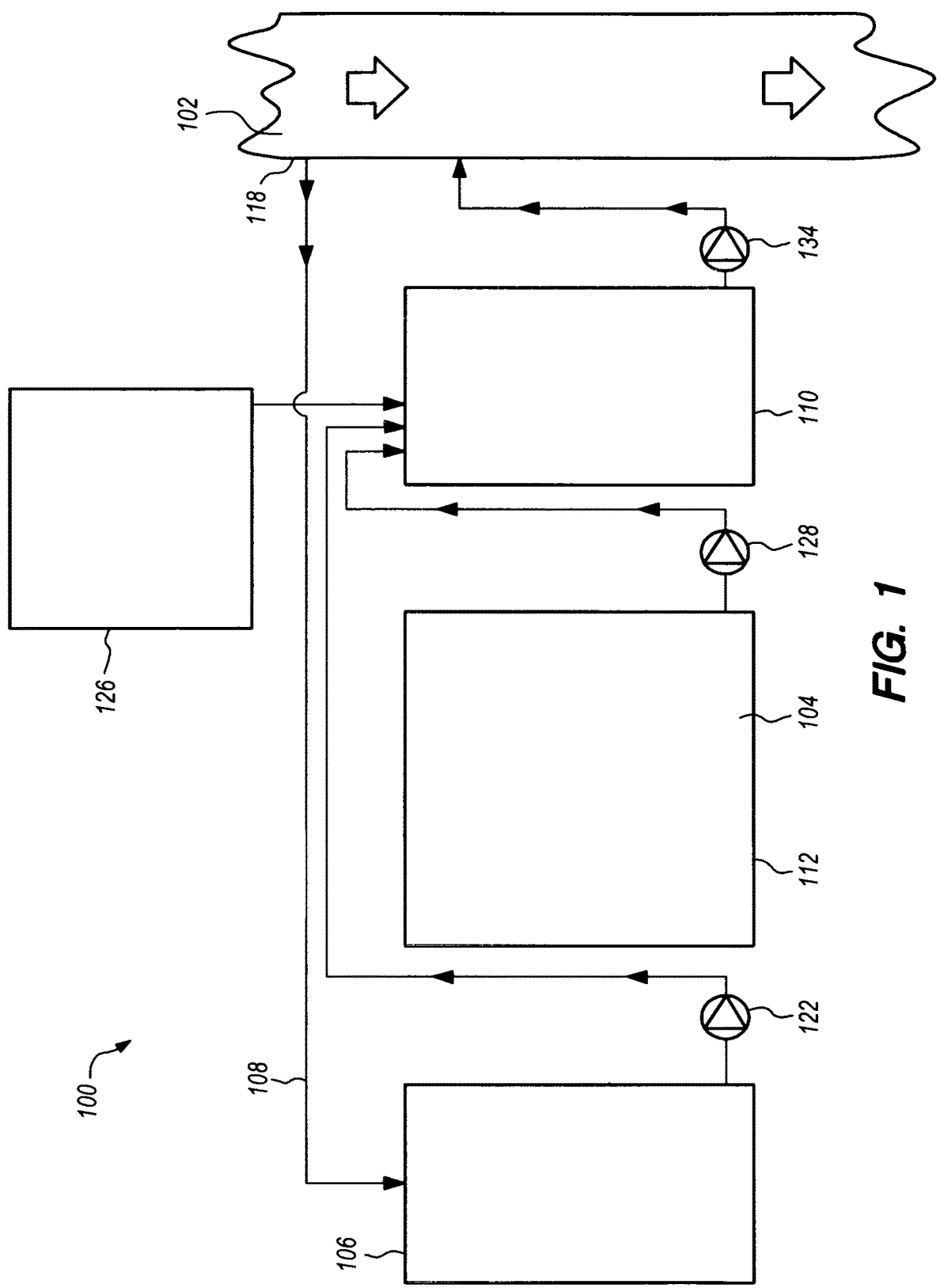
FIG. 1 is a mechanical schematic diagram of an overall view of the Advanced Liquid Treatment and Oxidation Method and System of the present invention showing an influent surge/pH adjustment tank subsystem, a disinfectant preparation tank subsystem, a holding/storage tank subsystem, a process mixing tank subsystem, an influent liquid stream to be treated, an influent pre-process line directed to the process mixing tank subsystem, and associated hardware utilized for injecting the disinfectant into the influent liquid stream.

An overall simplified diagram of the Advanced Liquid Treatment System 100 is shown in FIG. 1. The function of FIG. 1 is to illustrate the relationship between each of the main stages enumerated in the preceding paragraph. In general, the method and system of the present invention can be utilized in three separate modes. In a first mode of use, the influent 108 is introduced into the Advanced Liquid Treatment System 100 via an influent input line 118 as shown in FIG. 1. The influent 108 containing the harmful bacteria, viruses, pathogens, fungus, molds and other harmful invasive materials to be treated is introduced into the influent pH adjustment stage 106 of the Advanced Liquid Treatment System 100. This is accomplished by tapping the influent input line 118 and piping the influent to the influent pH adjustment stage 106. In the pH adjustment stage 106, chemicals including acids and bases are added to an influent surge/pH adjustment tank 120 (discussed in more detail in FIG. 2) to adjust the pH of the influent 108 to a range of (6.5-to-7.2) which has been determined to be suitable for this process. The pH adjusted influent 108 is then transferred via a pH adjustment transfer pump 122 to the (influent disinfectant) process mixing stage 110 as shown in FIG. 1.

The disinfectant preparation stage 112 shown in FIG. 1 comprises a preparation and blending section which includes both a preparation tank 124 (discussed in more detail in FIG. 4) and a holding/storage tank 126. A chemical catalyst is injected into the preparation tank 124 (see FIG. 4) of the disinfectant preparation stage 112 along with water and a combination of chemicals for providing the novel disinfectant 104 that is effective in destroying the invasive species of bacteria, viruses, pathogens, and other organic and inorganic pollutants. The disinfectant 104 created in the preparation tank 124 (see FIG. 4) of the disinfectant preparation stage 112 is a combination of the chemical catalyst, calcium hypochlorite and water. Further, the catalyst is comprised of a combination of chemicals which facilitates the destruction of the invasive species. This combination of chemicals does not exhibit the corrosive nature of the chlorine preparations used in the past to destroy the invasive species carried within the influent 108. Moreover, the chemical combination of the disinfectant 104 does not damage the environment. The disinfectant 104 is then transferred via a flow control valve 128 to the (influent-disinfectant) process mixing stage 110 as shown in FIG. 1. Additionally, the holding/storage tank 126 is (a) also connected to the (influent-disinfectant) process mixing tank 110 as shown in FIG. 1, and (b) is in mechanical communication with the disinfectant preparation tank 124 through a plurality of flow control valves (shown and discussed in FIG. 4).

At this point, the pH adjusted influent 108 from the Influent pH Adjustment Stage 106 and the novel disinfectant 104 from the Disinfectant Preparation Stage 112 have been transported to the (Influent-Disinfected) Process Mixing Stage 110 for mixing and blending as shown in FIG. 1. The output of the Process Mixing Stage 110 is returned via a process mixing transfer pump 134 to the influent input line 118 as a pH adjusted disinfected influent 108 as shown in FIG. 1. It is noted that the previously cited Filtration and Discharge Stage 114 is located between the process mixing transfer pump 134 and the point where the pH adjusted disinfected influent 108 is delivered back to the influent input line 118. The Filtration and Discharge Stage 114 will be discussed in conjunction with FIG. 5 herein below.

Figure 2:
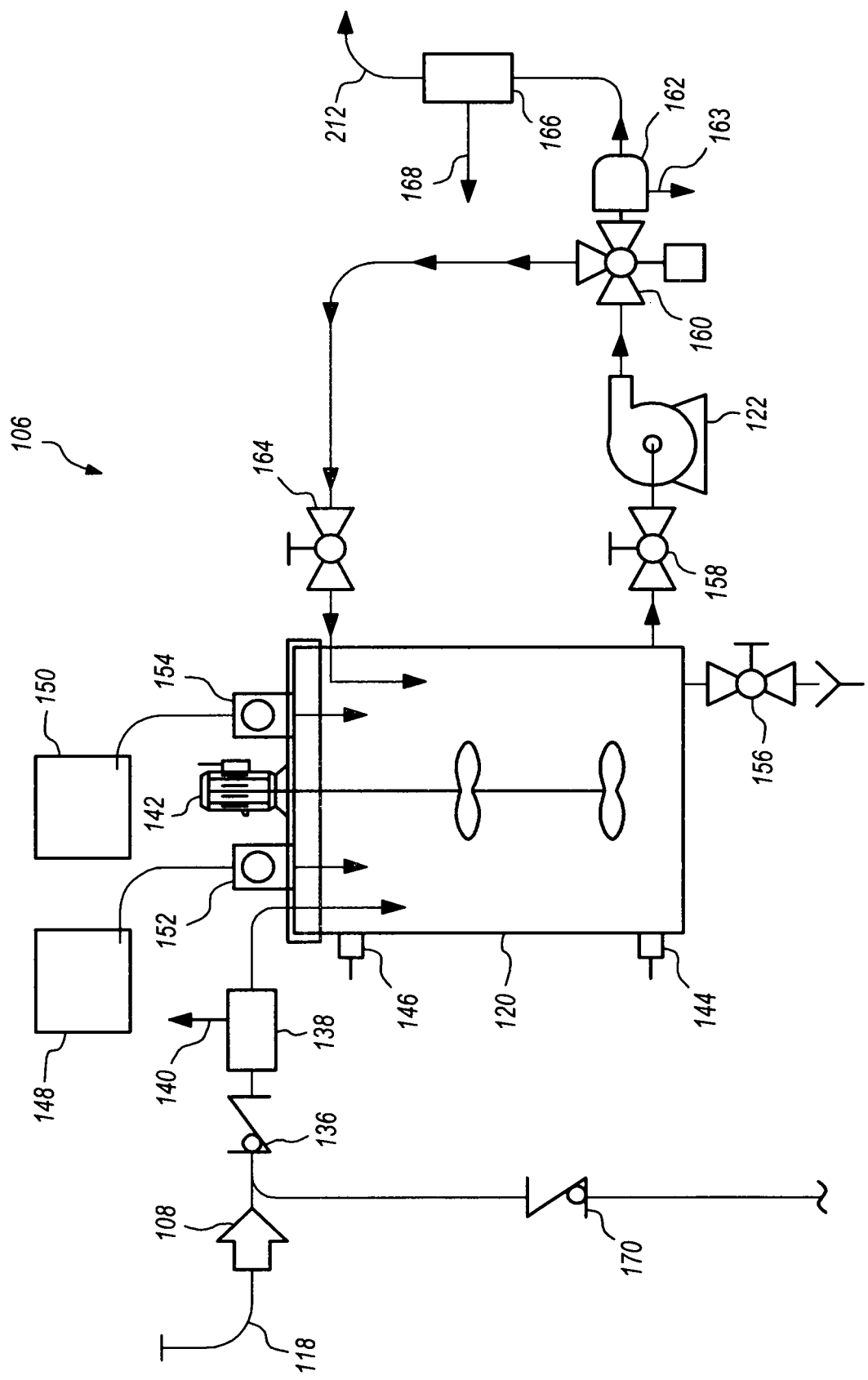
FIG. 2 is a detailed schematic diagram of the influent surge/pH adjustment tank subsystem showing an acid/pH adjustment holding tank and a base/pH adjustment holding tank, each connected to a pH adjustment tank via a corresponding chemical mixing pump for adjusting the pH of the influent liquid stream.
Figure 3:
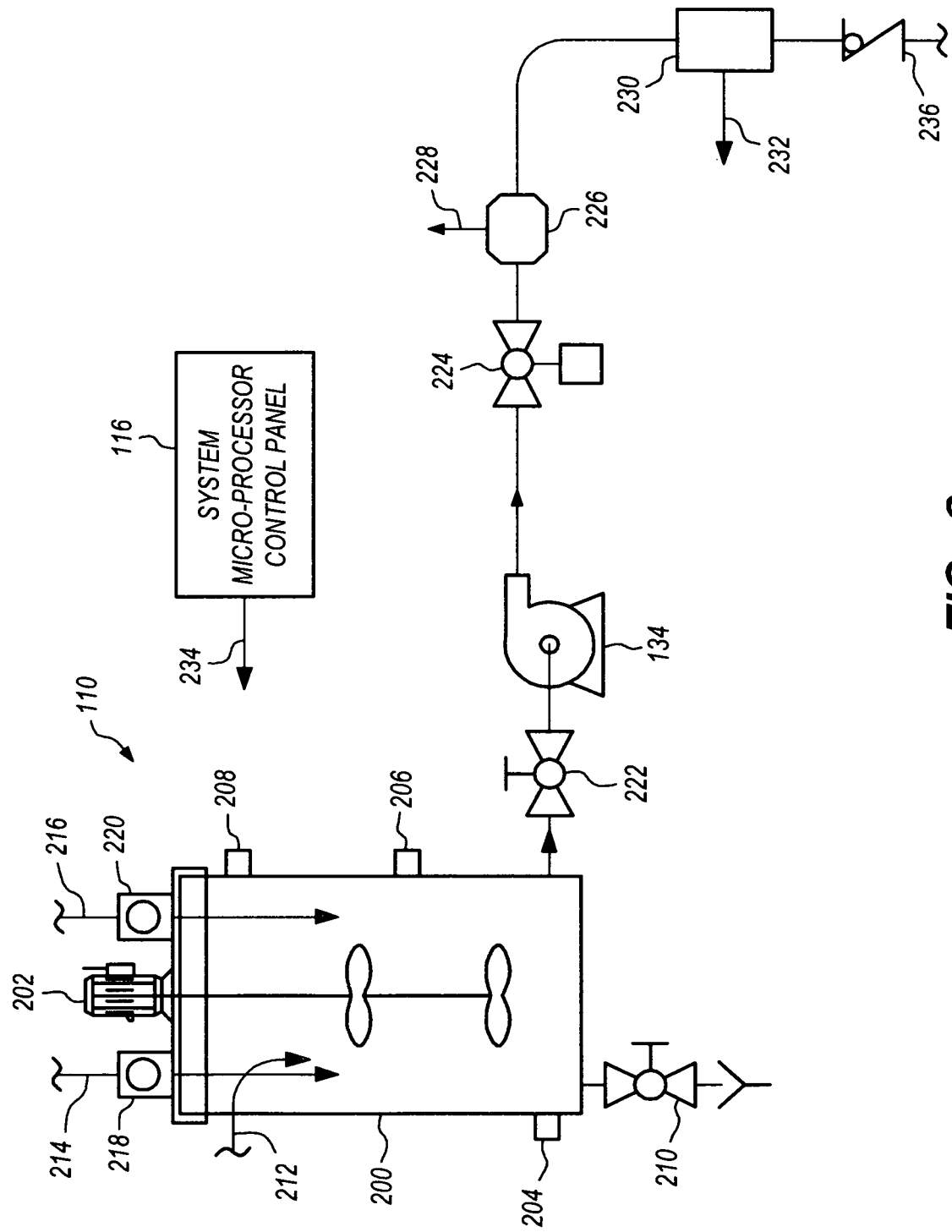
FIG. 3 is a detailed schematic diagram of the process mixing tank subsystem showing a process mixing tank having a pair of chemical mixing pumps and a media mixer for blending a novel disinfectant into the pH adjusted influent, and further showing a system microprocessor control panel for controlling the operation of the present invention.

The remainder of the detailed description of the Advanced Liquid Treatment System 100 of the present invention shown in FIGS. 2-5 will disclose the hardware components not shown in the simplified FIG. 1 that are required to disinfect aqueous solutions 102 by utilizing the novel disinfectant 104. One of the objectives of the present invention is to employ the novel disinfectant 104 to destroy harmful bacteria, viruses and pathogens and other microorganisms to make the water safe for use in multiple industrial processes. It is to be understood that the System Microprocessor Control Panel 116 shown in FIG. 3 is in electrical signal communication with each of a plurality of sensors distributed throughout each of the stages of the present invention. The Control Panel 116 receives the signal readings from a set of parameters located throughout the Advanced Liquid Treatment System 100 for evaluating the quality of the treated influent 108 at the various stages of the process. The fact that the System Microprocessor Control Panel 116 is located on FIG. 3 adjacent to the Process Mixing Stage 110 is not relevant to the universal significance of the Control Panel 116.

In a preferred embodiment of the present invention, FIG. 2 shows the Influent pH Adjustment Stage 106 of the Advanced Liquid Treatment System 100. The influent 108 to be treated is shown entering the Influent pH Adjustment Stage 106 via the influent input line 118. The influent 108 can be raw water, waste water, a beverage stream or any equivalent. The influent 108 passes through a process flow check valve 136 and then directly into a first bank of process sensors 138 which sends signal data directly to the system microprocessor control panel 116 via lead line 140. The signal data sent from the process sensors 138 to the control panel 116 include the parameters of the influent 108 including temperature, resistivity, conductivity, pH, and the Oxygen Reduction Potential (ORP). The parameter readings enable the control panel 116 to make adjustments to the pH of the influent 108 to best advance the process. Afterwards, the influent 108 is deposited into the input surge/pH adjustment input tank 120 introduced in FIG. 1.

The pH adjustment input tank 120 shown in FIG. 2 is designed to change the pH of the influent 108 by changing the acidic or basic complexion of the influent 108. The pH adjustment tank 120 is a polypropylene tank which includes a media mixer 142 having a pair of low speed mixing blades for blending chemical constituents, a pair of level switches 144, 146 to indicate a low level and high level of the influent 108, respectively, an acid pH adjustment holding tank 148, and a base pH adjustment holding tank 150. The acid holding tank 148 is connected to a chemical metering pump 152 while the base holding tank 150 is connected to a chemical metering pump 154. Each of the media mixer 142, and the pair of chemical metering pumps 152, 154 are mounted upon the top housing of the pH adjustment tank 120. The acid pH adjustment holding tank 148 feeds the chemical metering pump 152 to adjust the acidic content of the influent 108. Likewise, the base pH adjustment holding tank 150 feeds the chemical metering pump 154 to adjust the basic content of the influent 108. In combination, the pH level of the influent in the pH adjustment tank can be modified. Experimentation has shown that an ideal pH level for this process is from 6.5-to-7.2 on a scale of from 1-to-14 where readings less than 7.0 are regarded as acidic and readings greater than 7.0 are regarded as basic. A sample drain valve 156 is shown at the bottom of the pH adjustment tank 120 for draining sludge and runoff.

The output of the pH adjustment tank 120 is the pH adjusted influent 108 which passes through an isolation shut off valve 158 to permit isolating that part of the system such as, for example, for maintenance. The pH adjusted influent 108 is then moved through the transfer pump 122 shown in FIG. 2 (but originally introduced in FIG. 1). The transfer pump 122 then moves the process stream of the pH adjusted influent 108 through a flow control valve 160 and a process flow sensor 162. The flow control valve 160 is bi-directional in that it can direct the pH adjusted influent 108 to the process flow sensor 162 or, in the alternative, the flow control valve 160 can redirect the flow to another isolation shut off valve 164. The isolation shut off valve 164 when open, provides a feedback loop to the pH adjustment tank 120. The process flow sensor 162 senses the flow of the pH adjusted influent 108 as it passes through toward the process mixing stage 110. The parameter flow data is reported to the microprocessor control panel 116 via a lead line 163 as shown on FIG. 2. The pH adjusted influent 108 next passes through a second bank of process sensors 166 which is connected to the microprocessor control panel 116 via lead line 168. The second bank of process sensors 166 provides a second evaluation of the pH of the influent 108 by the system microprocessor control panel 116. Based on the parameters provided by the processor sensors 166, the control panel 116 determines the route of the influent 108. If the pH of the influent 108 is not within specifications, then the influent 108 is routed through the flow control valve 160 to the isolation shut off valve 164 back to the pH adjustment tank 120 for further treatment. If the parameters measured at the second bank of process sensors 166 indicate that the pH of the influent 108 is within specifications, then the influent 108 is advanced to the process mixing stage 110. Finally, the pH adjustment stage 106 is separated from the filtration and discharge stage 114 by a process flow check valve 170 as shown in FIG. 2.

The disinfectant preparation stage 112 is where the novel disinfectant 104 of the present invention is created when operating in the first mode and the second mode of the invention. We now continue to discuss the structure of the present invention operating in the first mode. Referring now to FIG. 4, the preparation tank 124 is shown having a pair of motorized media mixers 172 and 174 each including a pair of low speed mixing blades for blending the ingredients of the disinfectant 104. The preparation tank 124 is where the disinfectant is blended and mixed for injection into the process mixing stage 110 (discussed in FIG. 3). A low level switch 176 and a high level switch 178 are mounted on the side of the preparation tank 124 for indicating low levels and high levels of the disinfectant 104, respectfully. A sample drain valve 180 for draining sludge and residue is shown at the bottom of the preparation tank 124.

The control chemical ingredients of the disinfectant 104 are shown stored in holding tanks adjacent to the preparation tank 124 including a water holding tank 182, a catalyst holding tank 184 and a chemical holding tank 186 containing calcium hypochlorite (bleach). The chemicals in these three holding tanks are mixed and blended to create the novel disinfectant 104. The water holding tank 182 is connected to a first chemical metering pump 188, the catalyst holding tank 184 is connected to a second chemical metering pump 190, and the chemical holding tank 186 is connected to a third chemical metering pump 192 as shown in FIG. 4. Each of the three chemical metering pumps 188, 190 and 192 are shown mounted on top of the housing of the preparation tank 124. The concentration of the ingredients that are combined to form the disinfectant 104 are extremely important in ensuring the effectiveness in destroying the bacteria, viruses, pathogens, and other microorganisms and invasive species. Consequently, an oxygen reduction potential (ORP) sensor 194 is positioned at the output of the preparation tank 124. The disinfectant 104 formulated from the contents of the three holding tanks 182, 184, 186 is inspected by the oxygen reduction potential (ORP) sensor 194. The ORP sensor 194 transmits signal data to the system microprocessor control panel 116 for evaluation as to the concentration of the disinfectant 104. The control panel 116 then, in turn, responds with signals to the three chemical metering pumps 188, 190, 192 with instructions for adjusting the percentages of the water, catalyst and calcium hypochlorite to be included in the concentration of the disinfectant 104.

The disinfectant 104 as noted is comprised of (1) water, (2) calcium hypochlorite, and (3) the catalyst. In the aggregate and by total volume, the catalyst comprises approximately 0.0045%, the calcium hypochlorite comprises approximately 12.4955%, and the water comprises approximately 87.5% of the disinfectant 104. The aggregate components of the disinfectant 104 totals to one-hundred percent. Furthermore, the chemistry of the catalyst is very important and includes a grouping of six components. Those six components and their respective percentage by total volume of the catalyst include: (1) manganate comprising approximately 0.075%; (2) manganese oxide comprising approximately 0.01%; (3) potassium comprising approximately 0.075%; (4) permanganate comprising approximately 98.0%; (5) hydroxide comprising approximately 0.05%; and (6) water comprising approximately 2.10%. The six components listed here are mixed slowly by the slow speed mixing blades of the motorized media mixers 172, 174 of the preparation tank 124 within the Disinfectant Preparation Stage 112. The six components of the catalyst are mixed slowly at (65-70) degrees Fahrenheit to produce a liquid where the compounds are in solution. The percentages of these components forming the catalyst are very important and thus the oxygen reduction potential (ORP) sensor 194 positioned at the output of the preparation tank 124 senses the parameters associated with the catalyst. The sensed parameters are transmitted to the system microprocessor control panel 116 on a periodic schedule to determine whether the chemical metering pumps (188, 190, 192) shown in FIG. 4 should change the amounts of water, catalyst and calcium hypochlorite that should be injected into the mix of the disinfectant 104 in the preparation tank 124.

The Advanced Liquid Treatment System 100 is both a chemical process and system to store, mix, blend, and administer the disinfectant 104 in the proper strength and percentages in the influent 108 to be treated. The disinfectant 104 is a liquid ozone that increases the saturation and delivery of free oxygen radicals and makes the process of oxygen reduction potential (ORP) a practical tool to ensure the desired oxidation energy. By creating an oxygen/oxidative environment rather than a toxic environment, the present invention utilizes less chemistry to do a better job and thus effect a broader spectrum of organics. Adjunct to the ozonition, the Advanced Liquid Treatment System 100 and the novel disinfectant 108 reduces the ozone demand by carrying the oxidation energy to eliminate algae, bacteria, viruses, fungus and molds, yeast, protozoan, fungal pathogens, and biofilm. The Advanced Liquid Treatment System 100 also (a) reduces the production of bromates (D.P.), creosmin (NIB), residues and micro-nutrients, and are uniquely designed for use in the administration, storage, handling, control and monitoring of the novel disinfectant 108 added to the treated influent 108 to achieve the desired result. The present invention is an ionic solution that mimics biochemical water for and in the production of oxygen species. An ionic solution is one in which ions are in solution tend to be given up (as in donor materials) to organic or inorganic material. Some solutions tend to provide free donor ions and other solutions tend to accept free donor ions. A free radical is an oxygen molecule that is free of its bound structure and is available to move to organic or inorganic material (similar to donor electrons in electricity). This concept is important in the present invention because it is within this process that the oxidative quality to disinfect the treated influent 108 occurs. If the ionic solution within the chemistry of the additive solutions has many free radical ions, then the higher the efficiency of the additive solution. This is the case since more free radical ions will contact the organic or inorganic material to kill the pathogens, bacteria, or invaders of the invasive cells within the influent 108. The ion exchange with metals in solution tends to disrupt or weaken the protein shell of the bacteria, virus or pathogen. This permits the oxygen radical to enter the cell structure of the bacteria, virus, or pathogen causing "over oxidation" and disrupting the DNA structure of the invasive cell. This action results in the bacteria, virus or pathogen not to be able to replicate resulting in the death of the invasive cell. The disinfectant 104 of the present invention is utilized as an oxidizer attacking organic material and some inorganic material to eliminate harmful invasive species in industries.

The disinfectant 104 is a loosely bound chelation of metal minerals with oxygen in a liquid form. This oxygen molecule was purposely developed to be weakly bound so that when in contact with inorganic matter, organic matter, or microorganisms, it will readily surrender oxygen atoms that will aggressively oxidize all desired contaminants. A unique feature of this reaction is the release of single atoms of oxygen. These oxygen atoms embed into the molecular structure of the organic material and the structure of the pathogens, bacteria, viruses and microorganisms thereby perpetuating the release of highly active atoms of oxygen. The blended disinfectant 104 capitalizes on the properties and principles of the Haber-Weiss reactions. When introduced as a disinfectant 104, the following sequence occurs to the invasive species: (1) oxidation of scavengers; (2) pre-oxidation/disruption of the membrane layers; (3) oxidation of the Thiol groups; (4) enzyme inhibition; (5) oxidation of nucleotides; (6) impaired energy production; (7) disruption of protein synthesis; and (8) cellular death of the invasive species. Thus, the destruction of these invasive species is accomplished by employing "over-oxidation techniques" to disrupt the DNA structure of the invasive cell of the bacteria, virus, pathogen or the like.

Thus, it is the oxygen reduction potential (ORP) of the disinfectant 104 that includes many free radical oxygen molecules which causes the disinfectant 104 to have a higher oxidative quality to disinfect the influent 108 and to kill more of the pathogens, bacteria, viruses of the invader cells within the organic and inorganic materials. Consequently, the oxygen reduction potential (ORP) sensor 194 located at the output of the preparation tank 124 senses the organic mass in solution and reports the parameters of the disinfectant 104 to the system microprocessor control panel 116 for adjusting the percentages of the chemical constituents added to the preparation tank 124. The disinfectant 104 is also used for the precipitation of compounds from aqueous solutions. During precipitation of compounds, the invader pathogens are killed by the disinfectant 104. The dead invader cells are deleted and collected in collector tanks and subsequently removed as sludge through the many sample drain valves 156, 180 and the like shown in FIGS. 2-5. The disinfectant 104 is environmentally safe, dissipates quickly, is inert and is fast reacting.

The method associated with the Advanced Liquid Treatment System 100 has been developed for and as a replacement for the currently used chlorine and peroxide, liquid, gas and mineral products used in water treatment processes. Its use reduces the volume and cost to the water purveyors and industry, and greatly increases the effectiveness and range of organic elimination without the harmful effects to the environment. The Advanced Liquid Treatment System 100 also reduced equipment and operation/maintenance of, but not limited to, facilities costs. The present invention can be used or applied in a wide range of applications including: potable water; waste water; industrial water; clean-in-process; food industries; agriculture; irrigation; process rinse water; oil industries; gas and oil well production; bacterial and viral pathogens elimination; beverage industries; dairy industries; poultry industries; beef and pork industries; food packaging; environmental industries; pharmaceutical industries; cosmetic industries; and desalinization and reverse osmosis, to name a few.

At the output of the preparation tank 124, an arrangement of three flow control valves 128, 130, and 132 determine the direction of flow of the disinfectant 104. If flow control valves 128 and 130 are open and flow control valve 132 is closed, the disinfectant 104 is directed from the preparation tank 124 to the process mixing stage 110. This is the valve arrangement that typically exists in the first mode of operation and the second mode of operation. However, if the flow control valves 128 and 132 are open and flow control valve 130 is closed, then the disinfectant 104 is directed from the preparation tank 124 to the holding/storage tank 126 as shown in FIG. 4. This valve arrangement is intended to facilitate the filling of holding/storage tank 126 for future use. Finally, if the flow control valve 128 is closed but flow control valves 130 and 132 are open, this configuration facilitates flow of the disinfectant 104 from the holding/storage tank 126 to the process mixing stage 110. This valve configuration typically is used for the third mode of operation. The distinction between the first mode, the second mode and the third mode of operation of the Advanced Liquid Treatment System 100 will be disclosed after the description of the first mode of operation has been completed.

Figure 4:
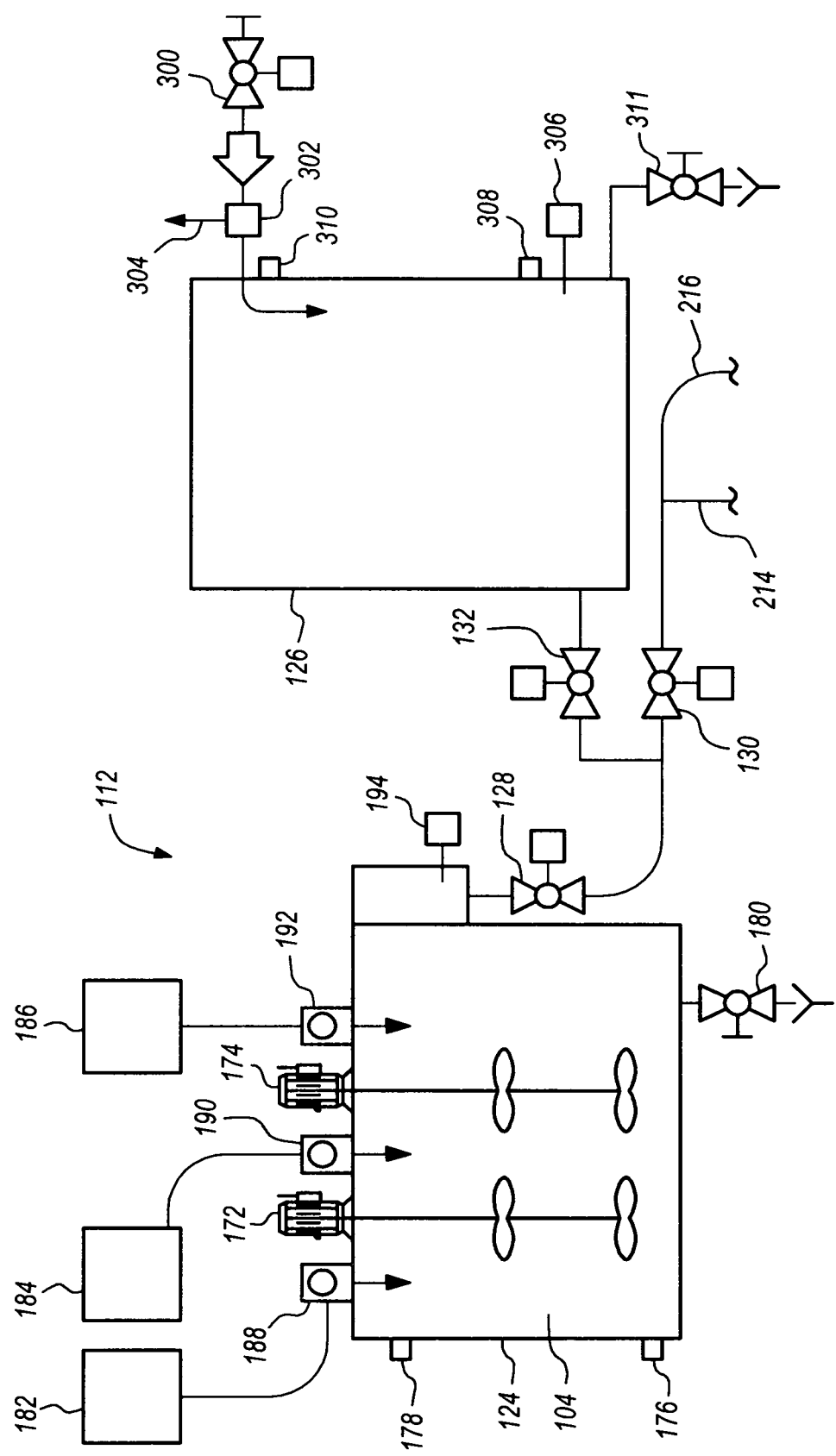
FIG. 4 is a detailed schematic diagram of the disinfectant preparation tank subsystem showing a water holding tank, a catalyst holding tank, and a calcium hypochlorite holding tank, each connected to a disinfectant preparation tank via a chemical metering pump, and a media mixer for preparing a novel disinfectant, and a holding/storage tank for storing the disinfectant.
Figure 5:
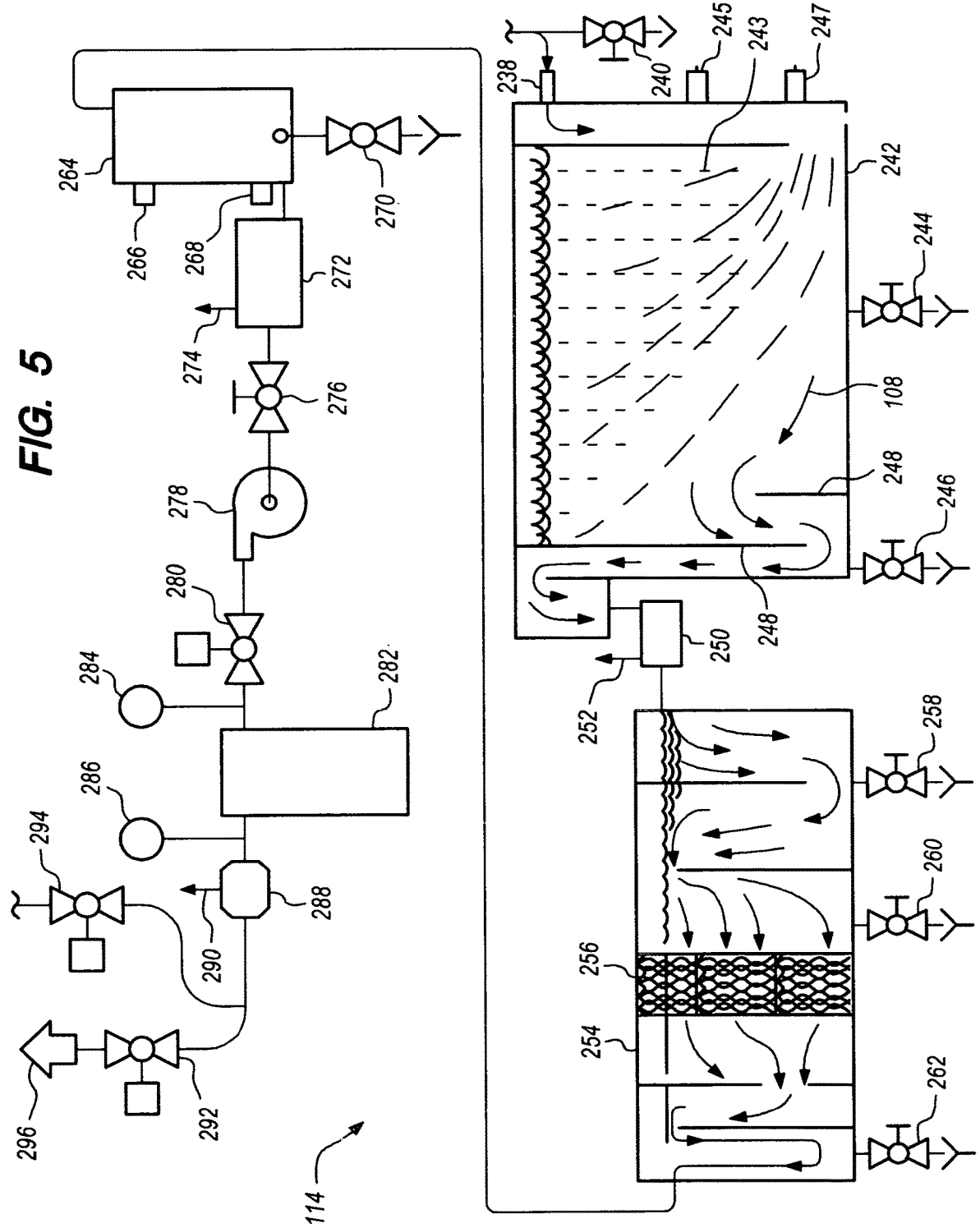
FIG. 5 is a detailed schematic diagram of a reaction stabilization, settlement, filtration and discharge stage having a plurality of tanks including (a) a settling tank, and (b) a coalescing tank for filtering out particulate matter and oil residue, and {c} a surge tank for regulating the influent flow in the system, and as a discharge stage for the treated influent.

The process mixing stage 110 is shown in FIG. 3 and includes a process mixing tank 200 which is utilized for the mixing and blending of the pH adjusted influent 108 from the pH adjustment tank 120 shown in FIG. 2 and the disinfectant 104 from the preparation tank 124 shown in FIG. 4 (or the holding/storage tank 126 when in the third mode of operation). The process mixing tank 200 includes a motorized media mixer 202 having a pair of low speed mixing blades for blending purposes, three level switches including a low level switch 204, a mid-level switch 206, and a high level switch 208, each for sensing the level of influent 108. A sample drain valve 210 is shown mounted to the bottom of the process mixing tank 200 for draining sludge and residue therefrom. The process mixing tank 200 receives three inputs including an input 212 from the pH adjusted influent 108 (shown on FIGS. 2 and 3), and a pair of inputs 214 and 216 (shown on FIGS. 3 and 4) carrying the disinfectant 104 to a corresponding duplex pair of chemical metering pumps 218 and 220, respectively, as shown in FIG. 3. The duplex chemical metering pumps 218, 220 injects the disinfectant 104 into the stream of influent 104.

The mixed output of the process mixing tank 200 passes through an isolation shut off valve 222 for isolating the mixing tank 200 such as, for example, during maintenance and then through the process mixing transfer pump 134. The transfer pump 134 provides the pressure to drive and regulate the flow of the influent 108 through a flow control valve 224 and a process flow sensor 226. The process flow sensor 226 sends parameter signals to the system microprocessor control panel 116 via lead line 228 for monitoring the flow rate data of the influent 108. The pH adjusted and disinfected influent 108 is next directed to the third bank of process sensors 230 which measures the parameters of the influent 108 including temperature, resistivity, conductivity, pH, and the Oxygen Reduction Potential (ORP). This parameter data is then transmitted to the microprocessor control panel 116 via a lead line 232. The third bank of process sensors 230 provides a third evaluation of the pH of the influent 108 by the system microprocessor control panel 116 for determining if any changes to the chemistry of the catalyst are required. Such a change might include, for example, adjusting the output of the chemical metering pumps 218, 220 to maintain the required strength of the disinfectant 104 to achieve the desired effectiveness. Likewise, the system microprocessor control panel 116 communicates with each of the sensor devices distributed throughout the Advanced Liquid Treatment System 100 via a communication cable 234. Finally, the pH adjusted disinfected influent 108 passes through a process flow check valve 236 to enter the Filtration and Discharge Stage 114.

An input line 238 to the Filtration and Discharge Stage 114 (shown in FIG. 5) extends from the process flow check valve 236 shown in FIG. 3. The input line 238 carries pH adjusted and disinfected influent 108. A sample drain valve 240 is shown and is employed to dispose of sludge and residue. The input line 238 directs the pH adjusted and disinfected influent 108 directly into a settling tank 242 which is a specific gravity separation type of tank. The specific gravity type settling tank 242 facilitates: {a} the settling out or settlement of particulate matter 243 in solution in the influent 108; {b} provides time for the component chemical additives of the disinfectant 104 to react on the influent 108; {c} provides time for the influent 108 to be disinfected; and {d} allows for the particulate matter 243 to fall to the bottom of the settling tank 242. A pair of sample drain valves 244 and 246 are shown mounted to the bottom of the settling tank for draining the particulate matter 243 at the bottom thereof. The influent 108 is urged from the input line 238 through the settling tank 242 by the process mixing transfer pump 134 (shown in FIG. 3). The influent 108 travels a circuitous route through the settling tank 242 bounded by a plurality of baffles 248 that urge the particulate matter to fall to the bottom of the settling tank 242. A pair of fluid level switches including a high level switch 245 and a low level switch 247 are positioned on the settling tank 242 for indicating to the control panel 116 the level of the influent 108 therein. Like most level switches, a low level indication by low level switch 247 would activate a transfer pump 134 while a high level indication by high level switch 245 would de-energize the transfer pump 134.

The influent 108 discharges through a fourth bank of sensors 250 mounted on the downstream side of the settling tank 242. The sensor data provided by the fourth bank of sensors 250 is sent to the system microprocessor control panel 116 via a lead line 252 for evaluation of the disinfectant 104. The control panel 116 then will send instructions to the chemical metering pumps 188, 190, and 192 to change settings if the concentration of the disinfectant should be changed. The output of the fourth bank of sensors 250 discharges into a coalescing tank 254 which is also a specific gravity separation tank. The influent 108 is routed up and down through a circuitous path to urge heavier particles to fall out of the solution. The coalescing tank 254 includes a coalescing filter 256 that is employed to collect oil residue or any particle that attaches to a polyethylene filter material. A group of three sample drain valves 258, 260, 262 are mounted to the bottom of the coalescing tank 254 for collecting sludge and residue.

The treated and disinfected influent 108 is then directed to a surge tank 264 also having a high level switch 266, a low level switch 268 and a sample drain valve 270. The surge tank 264 serves to regulate the fluid flow, i.e., influent 108, in the system. The fluid level switches 266, 268 and the sample drain valve 270 serve to track the fluid level in the system and to dispose of sludge and residue, respectively. Next, the influent 108 passes through a fifth bank of process sensors 272 for evaluating the content and status thereof as it relates to temperature, resistivity, conductivity, pH, oxygen reduction potential. These parameters are sent to the microprocessor control panel 116 via lead line 274 as shown in FIG. 5. If necessary, the concentration of the disinfectant 104 can be modified by making changes to the chemical metering pumps 188, 190, 192 in the Disinfectant Preparation Stage 112. Next, the influent 108 passes through an isolation shutoff valve 276 to enable that portion of the Filtration and Discharge Stage 114 to be isolated in case, for example, maintenance had to be performed thereon. The influent 108 next passes through an output transfer pump 278 that provides the pressure to force the influent 108 forward toward a flow control valve 280.

Next, a bag filter and housing 282 is in the line with a pressure gauge 284 and 286 positioned on each side thereof. The function of the bag filter and housing 282 is to remove any particulate matter that measures ten microns or less. The two pressure gauges 284 and 286 measure the upstream pressure and the downstream pressure to indicate a pressure drop across the bag filter 282. Such a pressure drop would indicate that the bag filter 282 is full and thus is possibly clogged. The influent 108 then next passes through a final process flow sensor 288 which sends sensor flow signals via lead line 290 to the system microprocessor control panel 116 for evaluation and also to a pair of flow control valves 292 and 294, respectively. The microprocessor control panel 116 evaluates the flow rate of the influent 108 through the process flow sensor 288. Downstream of the process flow sensor 288, the influent 108 can be transmitted to either: (a) a discharge port 296 of the advanced Liquid Treatment System 100 or a facility process (e.g., food processing plant) through the discharge flow control valve 292 as a discharge effluent, or (b) to re-circulation of the influent 108 back to the input of the pH Adjustment Stage 106 via the process flow check valve 170 shown in FIG. 2.

The preceding description of the four stages of structure (beginning on page 11 to page 25) has been for the first mode of use of the Advanced Liquid Treatment System 100. The second mode and third mode of use of the Advanced Liquid Treatment System 100 utilize the same structural arrangement as the first mode of use but the second mode and the third mode of use are different functionally.

In a second mode of use, the present invention is used for large fluid applications. For example, the Advanced Liquid Treatment System 100 of the present invention is utilized to disinfect large applications, for example, a raw water supply (influent 108) for a food processing application or an industrial process. Under such an application, introducing a raw water supply (influent 108) would require the disinfecting of millions of gallons of water per day to kill the invasive species. Such invasive species might include slime, slurries, algae, fresh water mussels, and other invasive species. In the second mode of use, each of the previous steps discussed in the first mode of use of the present invention are practiced including: the influent 108 being subjected to multiple banks of sensors (i.e., 138, 166, 230, 250, 272, 302), communicating with the microprocessor control panel 116; pH adjustment; creating a chemical solution comprising water, a chemical catalyst and other components for creating the disinfectant 104; pumping the disinfectant 104 and the pH adjusted influent 108 into a process mixing tank 200; and pumping large volumes of the treated influent 108 through settling tank 242, coalescing tank 254, and a surge tank 264 for filtering and regulating the flow of the disinfected influent prior to discharging an effluent from the Advanced Liquid Treatment System 100. The large volumes of the disinfected effluent is now suitable for use in washing vegetable produce, manufacturing beer or ales, and other applications requiring large volumes of disinfected water. The arrangement of the structural components in the second mode of use is the same as in the first mode of use.

In a third mode of use, a pre-blended disinfectant solution 104 is introduced into the storage tank 126 of the Disinfectant Preparation Stage 112 of the Advanced Liquid Treatment and Oxidation Method and System 100. That is, the step of creating the chemical disinfectant 104 in the third stage preparation tank 124 is replaced by introducing a pre-blended disinfectant solution 104 into the third stage storage tank 126 from an off-site blender operation as shown in FIG. 4. The off-site, pre-blended disinfectant 104 is introduced through a flow control valve 300 which is passed through the sixth and final bank of process sensors 302 for measuring temperature, resistivity, conductivity, pH, and oxygen reduction potential (ORP). The bank of process sensors 302 deliver the measured parameter data to the system microprocessor control panel 116 via a lead line 304. The pre-blended disinfectant 104 is then introduced into the holding storage tank 126 as shown in FIG. 4. An oxygen reduction potential (ORP) sensor 306 is associated with the holding storage tank 126 for measuring the oxidation potential of the pre-blended disinfectant 108 as previously discussed above. The holding storage tank 126 also includes a pair of fluid level switches including a low level switch 308 for indicating a low level of pre-blended disinfectant 104 and a high level switch 310 for indicating a high level of pre-blended disinfectant 104. Either level switch 308 and 310 can control the flow control valve 300 for changing the level of disinfectant 104 in the holding storage tank 126. A sample drain valve 311 is also shown for draining sludge and residue from the holding storage tank 126.

This pre-blended disinfectant 104 is utilized to treat the influent 108 to destroy the invasive species as previously described. All of the steps practiced in the first mode of use are included such as: the influent 108 being subjected to multiple banks of process sensors (i.e., 138, 166, 230, 250, 272, 302) communicating with the microprocessor control panel 116; pH adjustment; introducing the pre-blended disinfectant 104 into the third stage storage tank 126; pumping the disinfectant 104 and the pH adjusted influent 108 into a process mixing tank 200; and pumping the treated influent through the settling tank 242, coalescing tank 254, and surge tank 264 for filtering the disinfected influent 108 prior to discharging it from the Advanced Liquid Treatment System 100. Furthermore, the chemistry of the pre-blended disinfectant 104 can subsequently be adjusted within the process mixing tank 200 (shown in FIG. 3) if the off-site pre-blended disinfectant 104 is not within the system specifications. The output, the disinfected influent 108, can now be utilized to disinfect and kill invasive species found in any aqueous solution. The arrangement of the structural components in the third mode of use is the same as in the first mode of use.

An embodiment of the present invention is generally directed to an advanced liquid treatment and oxidation method and system 100 for disinfecting aqueous solutions utilizing a metal-oxy chloride process to destroy harmful bacteria, viruses and pathogens in industrial processes such as medical systems, food processing, and water purification systems including an influent stream 108 containing an invasive species, a pH adjustment stage 106 for maintaining the pH of the influent 108 to within a specific range, a preparation stage 112 for preparing a disinfectant 104 for destroying the invasive species, the disinfectant comprising a quantity of calcium hypochlorite, water, and a catalyst including the metal minerals manganate and manganese oxide, a process mixing stage 110 for receiving and mixing the pH adjusted influent 108 and the disinfectant 104, a filtration and discharge stage 114 receiving the pH adjusted and disinfected influent 104 for removing foreign matter prior to discharging a filtered disinfected effluent 108, and a system microprocessor control panel 116 for monitoring a plurality of process sensors (i.e., 138, 166, 230, 250, 272, 302) in each of the stages (i.e., 106, 110, 112, 114) for controlling the disinfecting of the influent 108.

The construction of the inventive advanced liquid treatment and oxidation method and system 100 provides (1) a Disinfectant Preparation Stage 112 that creates a novel disinfectant for destroying invasive species, (2) by employing "over-oxidation techniques" to disrupt the DNA structure of the invasive cell of the bacteria, virus, pathogen or the like, wherein (3) a combination of water, calcium hypochlorite and a catalyst are formulated to create the disinfectant 104, and (4) the catalyst is formulated from a plurality of metal minerals including but not limited to manganate and manganese oxide, (5) the disinfectant containing a low percentage of chlorine, (6) resulting in the combination of chemicals not exhibiting the corrosive nature of the chlorine preparations used in the past to destroy invasive species resident within the influent 108; and (7) the disinfectant 104 being highly efficient, cost effective, reduces maintenance costs, is applicable to many industries, is inert, non-corrosive, and not damaging to the environment.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility such as, for example, sterile medical systems, food processing systems, water purification systems, and beer manufacturing. It is therefore intended by the appended claims to cover any and all such modifications, applications and embodiments within the scope of the present invention. Accordingly,

What is claimed is:

1. A metal-oxide chloride system for disinfecting aqueous solutions utilizing oxidation techniques comprising:
    an influent stream containing an invasive species to be removed having a plurality of cells exhibiting a DNA structure;
    a pH adjustment stage having a plurality of process sensors comprising a first bank of process sensors and a second bank of process sensors,
        said first bank of process sensors exposed to said influent stream for directing the injection and mixing of chemicals in an influent surge pH adjustment tank for adjusting a plurality of pH parameters of said influent stream to be within a specified range; and
        said second bank of said process sensors located within said pH adjustment stage for monitoring said pH adjusted influent stream for determining whether said pH parameters are within said specified range;
    a disinfectant preparation and storage stage for preparing and storing a disinfectant for destroying said invasive species, said disinfectant preparation and storage stage comprising a preparation tank for preparing said disinfectant therein;
    a process mixing stage having a mixing and disinfectant tank for receiving and mixing said pH adjusted influent stream and said disinfectant for destroying said invasive species;
    a system microprocessor control panel for monitoring parameters determined by each of said first bank and said second bank of said process sensors for controlling the preparing of disinfectant in said disinfectant preparation and storage stage; and
    an Oxygen Reduction Potential (ORP) sensor positioned at an output of said preparation and storage tank for sensing the composition of said disinfectant, said Oxygen Reduction Potential sensor transmitting signal data to said system microprocessor control panel for evaluating the concentration of said disinfectant.

2. A metal-oxide chloride system for disinfecting aqueous solutions utilizing oxidation techniques comprising:
    an influent stream containing an invasive species to be removed having a plurality of cells exhibiting a DNA structure;
    a pH adjustment stage having a plurality of process sensors comprising a first bank of process sensors and a second bank of process sensors,
        said first bank of process sensors exposed to said influent stream for directing the injection and mixing of chemicals in an influent surge pH adjustment tank for adjusting a plurality of pH parameters of said influent stream to be within a specified range, and
        said second bank of said process sensors located within said pH adjustment stage for monitoring said pH adjusted influent stream for determining whether said pH parameters are within said specified range;
    a disinfectant preparation and storage stage for preparing and storing a disinfectant for destroying said invasive species, said disinfectant preparation and storage stage comprising a preparation tank for preparing said disinfectant therein;
    a process mixing stage having a mixing and disinfectant tank for receiving and mixing said pH adjusted influent stream and said disinfectant for destroying said invasive species; and,
    a system microprocessor control panel for monitoring parameters determined by each of said first bank and said second bank of said process sensors for controlling the preparing of disinfectant in said disinfectant preparation and storage stage; and
    wherein each of said first bank and said second bank of process sensors measures parameters including temperature, resistivity, conductivity, pH and Oxygen Reduction Potential (ORP) of said influent stream.

3. An advanced liquid treatment and oxidation method for destroying an invasive species in an aqueous solution comprising the steps of:

intercepting an influent stream of fluid containing an invasive species to be removed, said invasive species having a plurality of cells exhibiting a DNA structure;

adjusting and maintaining the pH of said influent stream within a specified range;

preparing a disinfectant for destroying said invasive species, said disinfectant being non-toxic, non-corrosive and inert, and being a chelation of metal minerals with oxygen in a liquid form for providing a source of single atoms for creating a plurality of free radicals of oxygen in the presence of said invasive species for oxidizing and destroying said invasive species by attacking said DNA structure of each of said cells of said invasive species by injecting oxygen therein for preventing cellular replication of said invasive species, and comprising a quantity of calcium hypochlorite, water and a catalyst;

mixing said pH adjusted influent stream with said disinfectant for providing a disinfected influent;

filtering said pH adjusted and disinfected influent for removing foreign matter prior to discharging a filtered disinfected effluent; and monitoring parameters of the filtered disinfected effluent with a plurality of process sensors evaluated by a system microprocessor control panel for evaluating said filtered disinfected effluent liquid.

4. The method of claim 3 further including the step of: mixing slowly at a temperature within the range of (65-70) degrees Fahrenheit for providing said catalyst in a liquid solution having the following components:

(a) manganate;
(b) manganese oxide;
(c) potassium;
(d) permanganate;
(e) a hydroxide; and
(f) water.

\* \* \* \* \*